United States Patent Office 3,153,438
Patented Oct. 20, 1964

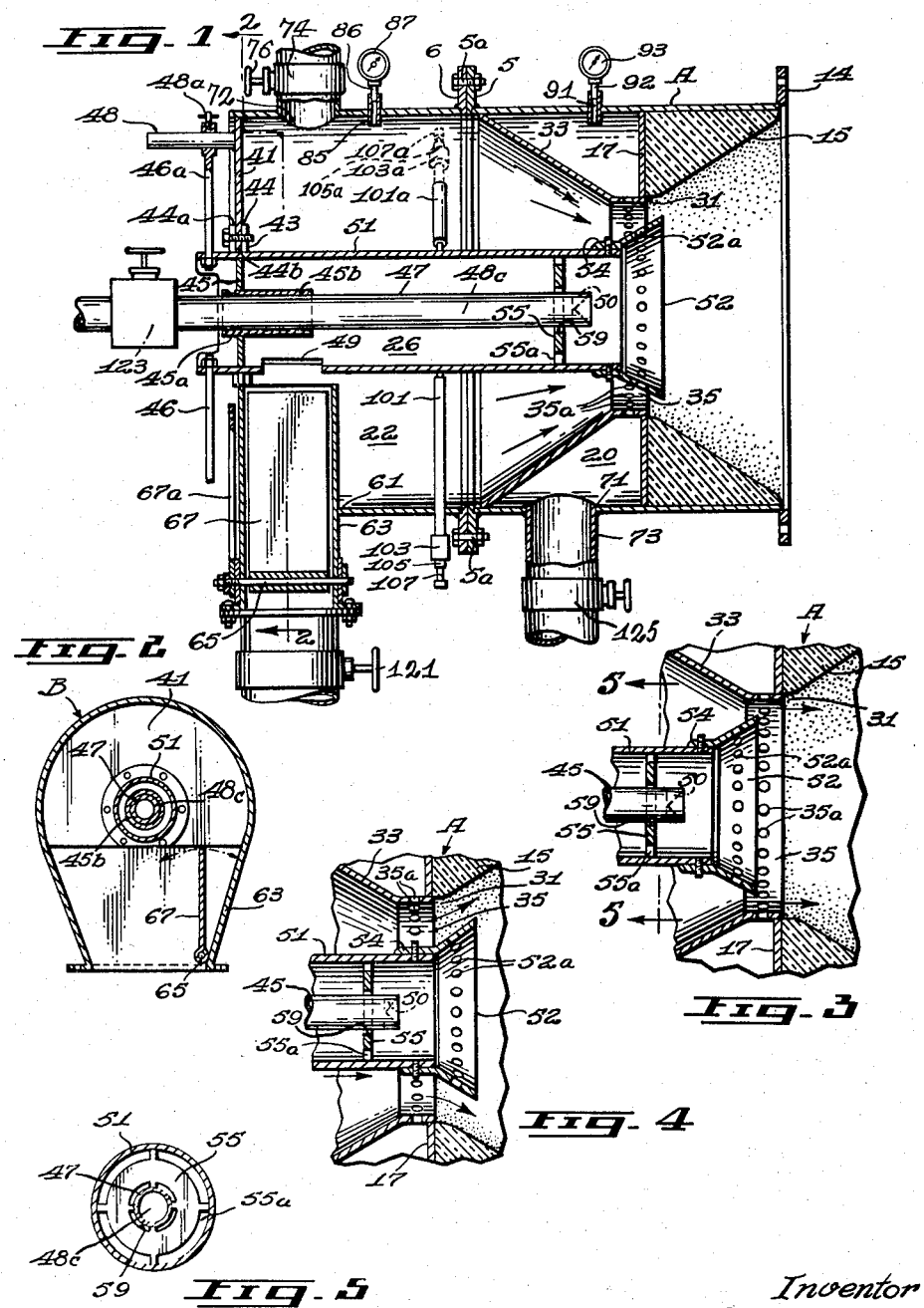

3,153,438
DUAL FUEL BURNER
Witold B. Brzozowski, 5754 Deom Ave.,
Montreal, Quebec, Canada
Filed Apr. 17, 1961, Ser. No. 103,642
5 Claims. (Cl. 158—11)

This invention relates to a dual fuel burner capable of burning either oil or gas or both.

There are many burners in existence which are designed to rotate the air while it is being mixed with a spray of atomized fuel. This method gives an improvement over a straight air flow. When the air, in its rotary movement, enters the atomized conical fuel spray, the diameter of the latter is enlarged considerably and oil droplets are dispersed more conveniently in the air stream. Consequently, the flame becomes shorter and more intense, and the combustion more complete.

Proper distribution of the oil droplets in the air is an important factor towards obtaining good combustion. The way the droplets are distributed depends on the grade of oil used (e.g., viscosity) on the atomizing nozzle which determines the size of the oil droplets, on the angle of the spray, and also on the speed of rotation of the air flow. If the rotation of the air is too rapid, the oil droplets are projected towards the walls, limiting combustion space. Consequently, carbon and other residue collect on the walls. On the contrary, if the rotation of air is too slow, the mixing of the oil and air is inadequate and combustion incomplete. Likewise with a gas fuel, when rotation of the air is too fast, there is an unnecessary loss of energy, and when too slow, a thorough mixing is not achieved.

The applicant has now developed an improved method and means for coping with these problems.

In accordance with the applicant's method, the fuel is burned with the rotation of the air being controlled in such a manner that the mixing of fuel and air is controlled so that it is adequate and yet not too rapid, having regard to different grades of fuels.

This method is carried out in accordance with the invention, by the use of an apparatus defined as follows. This apparatus includes a combustion chamber, preferably refractory-lined, having an entrance or mouth. Leading to this mouth is an expansive supply tube or housing. The housing is provided with an air opening accommodating an air duct for introducing air laterally into the housing. Control means, preferably an adjustable baffle or valve controls the direction of the air in such a way that it is projected more or less to one side of the housing thus causing rotation about the housing and the position of the baffle controlling the speed of this rotation. Separate valve means is provided for controlling the amount of air admitted.

A gas inlet is provided in the wall of the housing and means is also provided for controlling the amount of gas injected. The gas inlet is remote from the air inlet but the gas injected is influenced by the rotation of the air injected. In a preferred construction, the housing is provided in rear of the combustion chamber entrance with a frusto-conical wall extending from the wall of the housing forwards and inwards towards the combustion chamber entrance and terminating in a perforated gas distribution ring. The gas inlet, in this preferred construction, is desirably in advance of the conical wall. The conical wall, therefore, concentrates the air projected into the housing towards the entrance of the combustion chamber and also forms with the wall of the supply housing an annular gas chamber separated from the air chamber. The conical housing also concentrates gas when injected through an entrance in advance of the supply housing, causing it to flow through the openings in the gas distribution ring and to mingle with the air.

In another preferred arrangement there is mounted, concentrically in the housing, an oil supply tube terminating in a nozzle placed short of the end of the mouth of the combustion chamber.

Desirably, a partitioning tube extends from a header at the rear end of the housing to a position adjacent to the mouth of the combustion chamber to surround the oil supply tube.

In this construction, an air opening is preferably provided in the partitioning tube so that part of the air injected through the air inlet passes through the opening and is drawn forward in the space between the oil supply tube and the partitioning tube to cool the nozzle. Preferably, a baffle is provided near the end of the oil tube and between it and the partitioning tube wall, this baffle being provided with openings leaving a passage between it and the oil tube and also preferably leaving a passage at its outer extremity near the wall of the partitioning tube. The partitioning tube is also provided at its forward end with an outwardly flaring mouthpiece which is adapted, by change in its position, to control the direction of the air flow at the mouth of the combustion tube.

The partitioning tube is preferably advanceable forwardly and rearwardly for example by mounting it slidably in the header at the rear end of the housing. It is also desirable that the forward end of the partitioning tube be adjustable upwardly, downwardly and rearwardly. This is preferably accomplished in accordance with the invention by a tripod mounting of adjustable members extending from the wall of the housing at three different positions and between it the partitioning tube is held.

*Detailed Description*

The invention will now be described in more detail by reference to the accompanying drawings, which illustrate a preferred embodiment and in which FIGURE 1 is a vertical cross-section through the preferred burner.

FIGURE 2 is a vertical cross-section through the burner of FIGURE 1 substantially along the line 2—2 of that figure.

FIGURE 3 is a fragmentary view showing one position of the mouthpiece.

FIGURE 4 is a similar fragmentary view showing the mouthpiece in another position.

FIGURE 5 is a cross-section along the line 5—5 of FIGURE 3.

More specific reference will now be made to the drawings.

A is a housing tube, one end of which is abutted to the end of a housing tube B. The two tubes A and B are connected by welding to respective flanges 5 and 6 which are bolted together as at 5a. A combustion chamber is formed within the tube A by providing the latter with an annular flange 17 spaced from its forward end and a refractory lining 15. Combustion proper takes place within this refractory lined portion of the tube A.

The proportion of the combined tubes A and B to the left of the flange or header 17 constitutes a housing. A funnel member 33 extends inwards and forwards from a connection with the wall of the tube A adjacent to its rear end, the funnel member 33 terminating in a narrow cylindrical end portion 35 which projects forward to a connection with the flange or header 17. The ring portion 35 is provided with gas inlet openings 35a about its periphery. The tube B at the end remote from the tube A is provided with a header 41. The header 41 has a central opening 43 within which is mounted a partitioning tube 51. At the end of the tube 51 is mounted a frustoconical mouthpiece 52 which is held to the tube 51 by a flange 54 screwed to the end of the tube 51. The mouthpiece 52 is preferably provided with openings 52a about its periphery.

The header 41 about the margin of the opening 43 is provided with a pair of spaced-apart rings 44 and 44a which slidably accommodate the tube 51 and encloses a packing 44b which is trapped between the rings 44 and 44a, the edge of the opening 43 and the tube 51. Handles 46 and 46a are provided to pull the tube 51 back and forth in its mounting. A rod 48 is connected to the header 41 and extends through an opening in the handle 46a, a set screw 48a is provided to set the handle 46a and consequently the tube 51 in any given position with respect to the header 41.

Extending through the wall of tube B in the vicinity of the flange 6 are three guide tubes 101, 101a and a third tube, not shown. On the end of each of these tubes is a coupling 103, 103a and a similar coupling on the tube not shown, and welded to the coupling nuts 105, 105a and a similar nut on the coupling not shown. Elongated bolts 107, 107a and a similar bolt not shown engage the nuts and extend through the respective guide tubes to engagement with the outer wall of the tube 51. Adjustment of the bolts makes possible the adjustment of the position of the outer end of the tube 51 for purposes which will be described. It will thus be seen that the tube 51 is mounted at its inner end within the opening 43 of the header 41 and is held intermediate its inner and outer ends, between the bolts 107, 107a. Thus, the position of the tube 51 can both be adjusted forward and rearward as well as having its forward end adjusted up, down and sideways.

Within the tube 51 adjacent to the partition held in the opening 43 is an annular flange or a header 45. This header has a central opening 45a within which is rigidly mounted a guide tube or sleeve 45b. In the sleeve 45b is mounted an oil supply tube 47 which extends from the sleeve 45b forward to terminate short of the outer end of the tube 51. The tube 47 is concentric to the tube 51. The tube 47 is provided with a central oil supply passage 48c which extends forward from a source of oil supply which is not shown to the nozzle 50 at the end of the tube 47, the nozzle serving to disperse the oil in the mouth 31 for combustion purposes. A simple tube with one opening has been shown but it will be understood that a more complicated oil supply tube with multiple oil supply passages and return passages to the nozzle 50 may be employed and probably would be employed in practice. The specific oil supply arrangement is not "per se" a part of the invention.

Mounted within the tube 51 and to the rear of the nozzle 50 is a ring baffle 55 which constitutes an annular baffle. The central opening in this ring is of a size to be spaced from the tube 47 so as to provide between the ring 55 and tube 47 a narrow passage 59. The baffle 55 is preferably a ring held on a spider to the walls of the tube 51 so that actually there is an annular gap 55a between the outside edge of the baffle 55 and the wall of the tube 51. The purpose of this gap is merely to cause a smoother flame. It is not essential, but preferred. The tube B is provided with a large opening 61 which extends about part of its circumference and along part of its length. Mounted in this opening 61 is a rectangular air duct 63 which extends outwardly from the tube B and inwardly to within this tube. Mounted with the duct 63 is a spindle 65 carrying an air deflector plate or baffle 67 which is manipulated by a handle 67a to place it in various possible positions, as evident from the showing of FIGURE 2. The tube A is provided with a smaller opening 71 remote from the opening 61 and in the opening 71 is mounted a gas inlet tube 73 leading from a source of gas which is not shown. Positioning this inlet forward in the tube A is of advantage in reducing the possibility of flash-back and flame pulsation.

An alternative gas entrance has been shown at 72 to which leads a gas duct 74 controlled by a valve 76. The gas may be introduced through this entrance rather than through the entrance 71, if desired. In this event, the baffle 33 and ring 35 can be omitted from the structure.

Means are provided for example a cock-valve 123 for regulating the supply of oil through the pipe 47, means are also provided for supplying air to the duct 63 and there is suitable means for example a butterfly valve 121 for regulating the amount of air supplied. It should here be explained that the baffle 67 does not regulate the amount of air supplied but this is done separately by the air valve 121. The baffle 67 merely deflects the air so as to govern its speed of rotation about the central deflector or partitioning tube 51. Means are also provided for regulating the amount of gas supplied to the conduit 73 for example a valve 125.

An opening 49 is provided in the wall of the tube 51 near the air duct 63. The size of the opening 49 is not of great importance, but is large enough to permit cooling air to enter and circulate through the inside of the tube 51 to cool the nozzle 50. Theoretically this opening could be dispensed with and other means used to cool the nozzle, but the present construction is preferred.

The top of the tube B is provided with a small opening 85 in which is mounted a tube 86 carrying a pressure gauge 87 for gauging the air pressure. The wall of the tube A is provided with an opening 91 in which is mounted a tube 92 carrying pressure gauge 93 adapted to gauge the gas pressure. The front flange 14 of the tube A may be bolted to the rear flange of a boiler so that the flame is projected into the boiler, e.g., in the "Scotch" type of boiler. It can also be connected to a furnace. In the case of the boiler there is an additional combustion chamber within the boiler.

*Operation*

In operation, where the burner is operating on oil, the oil is introduced to the tube 47 through the supply passage 48c and is atomized by the nozzle 50 and projected towards the mouth 31 of the combustion chamber. Where the burner is operated on gas, the gas is introduced through the pipe 73 into the chamber 20 formed between the member 33, the header 17 and the wall of the tube A. Generally, either oil or gas will be used as the fuel but both may be used at the same time if desired.

In any case, air is introduced through the duct 63 into the chamber 22 formed between the partitioning tube 51 and the wall of the tube B. The air is caused first to take a circuitous path about the tube 51 by the baffle 67 and adjustment of this baffle as described elsewhere determines the speed of rotation of the air about this path. A portion of the air also passes through the opening 49 into the space 26 between the inner wall of the tube 51 and the oil supply tube 47. This air passing out through the openings 59 and 55a in the baffle 55 mingles with the oil projected from the nozzle 50.

After leaving the space 22 the air is concentrated by the member 33 causing it to pass through the mouth 31 and into the combustion chamber where it supplies oxygen for combustion with the oil spray from the nozzle 50. The air is forced forward by dynamic pressure. The air entering the opening 49 serves to cool the end of the tube 47 and the nozzle 50 and assists afterwards in the combustion of the atomized oil.

Where gas is employed as the fuel, the gas entering the gas inlet 73 comes through the openings 35a and is mixed with the air and the air-gas mixture is forced through the mouth 31 causing a rotating flame adjacent to this mouth.

The deflector plate or adjustable baffle 67 makes it possible to achieve the most advantageous speed of air rotation for a given fuel. Adjustment of the plate 67 in a clockwise direction (looking at FIGURE 2) allows the air to pass on both sides of the tube 51. So, where the blade is moved in a clockwise direction to a position directly against the wall of the passage it becomes inactive and does not direct the incoming air, but the air strikes the partitioning tube 51 directly and passes to both sides of it. Under these conditions, there is no rotation of the air about the tube. Adjustment of the plate 67 in a counter-clockwise direction causes more and more air to pass to the left-hand side of the tube 51 and consequently a faster rotation about the tube 51.

The frusto-conical mouth-piece 52 with the adjustable mounting of the tube 51 permits adjustment of the direction of flow of air through the mouth 31. At the same time the front end of the mouthpiece 52 may be adjusted up, down and laterally by the screws 107, etc., so as to place it off-center with respect to the burner outlet. This is important since more or less air may be directed to one side or the other and to compensate for possible unequal distribution in the oil spray which may be brought about by a faulty nozzle.

Referring more specifically to FIGURE 3 the mouthpiece is shown in a retracted position in which it causes a straight flow of air through the mouth 31. In the position of FIGURE 4, where the mouthpiece is advanced and its walls are substantially parallel to the refractory walls 15, it provides with the walls 15 a conical channel and this causes a conical flow of the air projecting it outwardly close to the walls of the combustion chamber.

The holes 52a shown in the mouthpiece 52 are not essential to the invention, but are desirable as they favour a smooth flame. Some of the air goes through the holes and some of it goes on the outside of the mouthpiece.

The position of the oil nozzle 50 may also be adjusted forwardly and backwardly by moving the oil tube 47 within the sleeve 45b. Experience will show the best position of the nozzle 50 for effective combustion.

While an adjustable baffle 67 is preferred, the invention also contemplates a member so arranged as to direct the air in a predetermined path providing the desired rotation of the air within the air chamber and at the mouthpiece so as to provide the flame characteristics desired.

It will be understood that one feature of the invention can be used to the exclusion of the other feature, i.e., the means for causing the spiral circulation of the air, specifically adjustable baffle 67. Likewise, the partition 51 could be omitted. Alternatively, the adjustable feature employed with the tube 51 to adjust the mouthpiece 52 forwards or backwards could be employed without other features. The baffle 33 can be eliminated, in which case it is desirable to flow the gas in through the alternative inlet 74. Thus, certain of the features described are new and useful in themselves and can be used to achieve certain advantages without necessarily being tied up with other features. Likewise, certain combinations of features are new and useful in themselves without necessarily being tied up with the entire combination described. These aspects of the invention are apparent when the application is considered in the light of the prior art.

This application is a continuation-in-part of United States patent application Serial No. 710,034, now abandoned, filed January 20, 1958.

I claim:

1. A burner, comprising a combustion chamber having an expansive mouth, a supply housing larger in cross-section than said mouth connected to said combustion chamber to the rear of said mouth and having an inwardly extending wall defining an outlet leading to said mouth, a partitioning tube including air inlet means and mounted centrally within the supply housing and extending from a point remote from the combustion chamber and having a delivery end adjacent to said outlet, an oil supply conduit mounted within the partition tube to extend from a point remote from the combustion chamber and having a delivery end adjacent to said outlet, the supply housing and partitioning tube forming therebetween a passage leading to said outlet, the supply housing being provided with an air inlet remote from said outlet and means within said air inlet for directing incoming air at least partially to one side of said partitioning tube so as to cause its rotation about said tube, a partition extending inwardly from the supply housing at points spaced from said inwardly extending wall to join the inwardly extending wall near said outlet to define between it and the supply housing a gas chamber, said supply housing being provided with a gas inlet leading to said gas chamber, said partition being provided with an annular gas distribution ring near said mouth having openings to permit gas to pass from said gas chamber through said outlet, the delivery end of the partitioning tube defining an inner fuel and air passage and the delivery end of the partitioning tube and outlet defining therebetween an outer fuel and air passage, the delivery end of the partitioning tube being provided with an outwardly flared mouthpiece adapted to baffle the air passing from the first mentioned passage between the supply housing and the partitioning tube through said outlet into said mouth, the partitioning tube being adjustably mounted to permit a limited amount of axial movement of its delivery end adjacent said outlet, and adjustable means for retaining said delivery end in centre and off-centre positions thereby to adjust the position of the delivery end of said tube in relation to said outlet.

2. A burner, as defined in claim 1, in which said oil supply conduit is mounted for adjustment forward and away from said outlet whereby the position of its delivery end may be varied with respect to the delivery end of the partitioning tube.

3. A burner, as defined in claim 1, in which the supply housing is cylindrical and the partitioning tube is cylindrical and substantially concentrically mounted in the supply housing and the said partition has a frusto-conical part leading from said supply housing and a cylindrical part constituting said gas ring.

4. A burner, as defined in claim, 1 in which the partitioning tube is cylindrical and the outwardly flared mouthpiece is frusto-conical.

5. A burner, as defined in claim 1, in which the supply housing is provided with a second gas inlet spaced from the air inlet and on the side of said partition remote from said outlet.

References Cited in the file of this patent

UNITED STATES PATENTS

| | | |
|---|---|---|
| 1,399,626 | Kraus | Dec. 6, 1921 |
| 1,433,392 | McFall | Oct. 24, 1922 |
| 1,686,213 | Koudritsky | Oct. 2, 1928 |
| 1,799,459 | Fantz | Apr. 7, 1931 |
| 1,951,379 | Voorheis | Mar. 20, 1934 |
| 2,015,572 | Spear | Sept. 24, 1935 |
| 2,214,246 | Finnigan | Sept. 10, 1940 |
| 2,233,529 | Herr | Mar. 4, 1941 |
| 2,485,656 | Raskin | Oct. 25, 1949 |
| 2,632,501 | Clark | Mar. 24, 1953 |
| 2,815,069 | Garraway | Dec. 3, 1957 |
| 2,818,109 | Voorheis | Dec. 31, 1957 |
| 2,982,347 | Kidwell et al. | May 2, 1961 |

FOREIGN PATENTS

| | | |
|---|---|---|
| 540,550 | Great Britain | Oct. 21, 1941 |
| 807,984 | Great Britain | Jan. 28, 1959 |
| 898,652 | Germany | Dec. 3, 1953 |